(No Model.)
G. WESTINGHOUSE, Jr.
PIPE COUPLING FOR PNEUMATIC RAILWAY BRAKES.
No. 249,128. Patented Nov. 1, 1881.
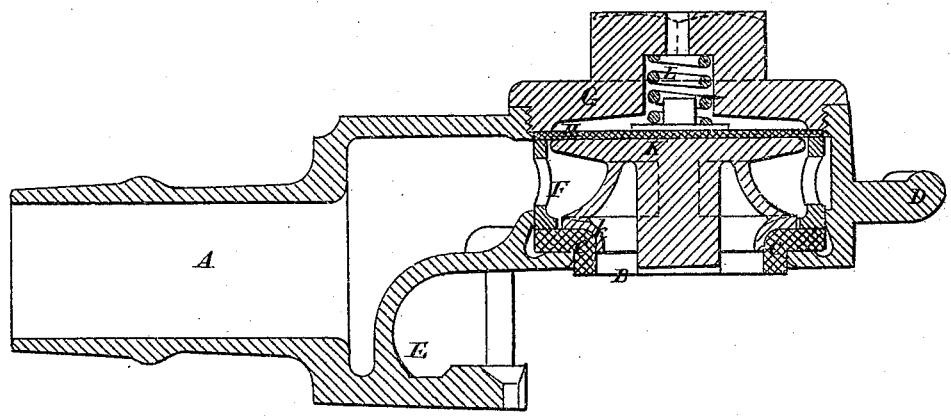
Witnesses:
C. S. Fetterman
R. H. Whittlesey
Inventor:
George Westinghouse Jr
by George H. Christy
his Atty

UNITED STATES PATENT OFFICE.

GEORGE WESTINGHOUSE, JR., OF PITTSBURG, PENNSYLVANIA.

PIPE-COUPLING FOR PNEUMATIC RAILWAY-BRAKES.

SPECIFICATION forming part of Letters Patent No. 249,128, dated November 1, 1881.

Application filed August 27, 1881. (No model.)

*To all whom it may concern:*

Be it known that I, GEORGE WESTINGHOUSE, Jr., a citizen of the United States, residing at Pittsburg, Pennsylvania, have invented a new and useful Improvement in the Couplings of Pipes for Pneumatic Railway-Brakes, of which the following is a specification.

For working brakes on a railway-train pneumatically, the pipe communicating throughout the train is connected from carriage to carriage by couplings, which are made in various forms. According to one form described in the specifications of patents previously granted to me, the coupling consists of two equal and symmetrical halves, which have lateral apertures provided with lips of caoutchouc or similar elastic material. The halves, being placed side by side, so that their respective lateral apertures face each other, are turned partly round the common axis of these apertures, so that a projecting segmental flange of each half engages in a hollow of the other, holding the halves together, but not so firmly but that they can be drawn apart by a considerable strain, such as might result from accidental separation of the carriages to which they respectively belong.

My present invention relates to means of providing against leakage at the junction of a pair of such half-couplings whether the train-pipes which they connect be employed to convey compressed air along the train or to communicate exhaustion for brakes worked by vacuum. For this purpose I construct each half-coupling as shown in longitudinal section by the accompanying figure.

A is the nozzle, to which is attached the piece of flexible hose connecting the half-coupling to the pipe of its carriage. The passage from A turns at right angles to the lateral aperture B, which is, as usual, provided with the caoutchouc lip C. The segmental projecting flange D and the corresponding hollow E are made for engagement in the usual way.

According to the modification, which is the subject of my present invention, I provide within the body of the coupling a cylindrical cage, F, having lateral apertures, which, by screwing down the cap G, is made to press on the outer edge of the packing C, and also on that of a flexible diaphragm, H, which is thus secured between the cap G and the cage F. Under the diaphragm H, and between it and the packing C, I introduce an inner cage, K, which has also lateral apertures. The cap G has a hole, *g*, opening to the outer air, and in the enlarged lower part of this hole is placed a spring pressing on the diaphragm H.

When the coupling is used for connecting-pipes for a vacuum-brake, when the pressure within the coupling is less than that of the external atmosphere, then the excess of the atmospheric pressure acting on the upper side of the diaphragm H conspires with the spring L to force down the inner cage, K, and its lower curved edge, *k*, squeezes the packing C so as to press the packings of the two half-couplings firmly together, and so prevent leakage of air between them into the pipes. When, on the other hand, the couplings are used for pipes conveying compressed air, then, though the diaphragm H is deflected upward, and the packing C is relieved from the pressure of the cage K, yet the excess of the internal pressure of air acts on the packing C so as to force its lip outward, and the packings of the two half-couplings are thus pressed firmly together, preventing leakage of air out of the pipes. The cage K is made with a central stem, which, by butting against a valve in the other half-coupling, (when such valve exists,) opens that valve for free passage of air when the half-couplings are connected.

Having thus described the nature of my invention and the best means I know of carrying it out in practice, I claim—

The combination, with a half-coupling and its packing-lip C, of the internal cage, K, and the diaphragm H, subject to atmospheric pressure, substantially as and for the purpose herein set forth.

In testimony whereof I have signed my name to this specification, in the presence of two subscribing witnesses, this 5th day of August, A. D. 1881.

GEORGE WESTINGHOUSE, JR.

Witnesses:
JOHN IMRAY,
JNO. P. M. MILLARD.